(12) United States Patent
Djenguerian et al.

(10) Patent No.: US 10,079,544 B2
(45) Date of Patent: *Sep. 18, 2018

(54) METHOD AND APPARATUS FOR IMPLEMENTING AN UNREGULATED DORMANT MODE WITH AN EVENT COUNTER IN A POWER CONVERTER

(71) Applicant: Power Integrations, Inc., San Jose, CA (US)

(72) Inventors: Alex B. Djenguerian, Saratoga, CA (US); Leif Lund, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/687,283

(22) Filed: Aug. 25, 2017

(65) Prior Publication Data

US 2017/0358992 A1 Dec. 14, 2017

Related U.S. Application Data

(63) Continuation of application No. 15/246,138, filed on Aug. 24, 2016, now Pat. No. 9,774,268, which is a
(Continued)

(51) Int. Cl.
*H02M 5/27* (2006.01)
*G05F 1/577* (2006.01)
(Continued)

(52) U.S. Cl.
CPC ......... *H02M 3/33523* (2013.01); *H02M 1/08* (2013.01); *H02M 3/33507* (2013.01);
(Continued)

(58) Field of Classification Search
USPC ..... 307/31; 323/267, 284; 363/21.12, 21.15, 363/21.16
See application file for complete search history.

(56) References Cited

U.S. PATENT DOCUMENTS 4,510,562 A 4/1985 Maeba
4,733,135 A 3/1988 Hanlet
(Continued)

FOREIGN PATENT DOCUMENTS

CN 1536749 A 10/2004
CN 1787350 A 6/2006
(Continued)

OTHER PUBLICATIONS

PRC (China) Patent Application No. 201610346052.3—Chinese Office Action and Machine Translation dated Dec. 18, 2017, 13 pages.
(Continued)

*Primary Examiner* — Gary Nash
(74) *Attorney, Agent, or Firm* — Christensen O'Connor Johnson Kindness PLLC

(57) ABSTRACT

A method for controlling an output of a power converter with a control circuit includes generating a drive signal to control switching of a switch to regulate the output of the power converter. It is detected if a switching period of one switching cycle of the drive signal exceeds a threshold switching period. The drive signal is disabled when a period of a switching cycle of the drive signal exceeds the threshold switching period for a threshold consecutive number of switching cycles.

23 Claims, 10 Drawing Sheets

Related U.S. Application Data continuation of application No. 14/535,730, filed on Nov. 7, 2014, now Pat. No. 9,484,822, which is a continuation of application No. 13/465,882, filed on May 7, 2012, now Pat. No. 8,908,395, which is a continuation of application No. 13/170,018, filed on Jun. 27, 2011, now Pat. No. 8,194,421, which is a continuation of application No. 12/366,574, filed on Feb. 5, 2009, now Pat. No. 7,995,359.

(51) Int. Cl.
*H02J 3/14* (2006.01)
*H02M 3/335* (2006.01)
*H02M 1/08* (2006.01)
*H02M 1/00* (2006.01)

(52) U.S. Cl.
CPC ........... *H02M 2001/0009* (2013.01); *H02M 2001/0032* (2013.01); *Y02B 70/16* (2013.01); *Y10T 307/406* (2015.04)

(56) References Cited

U.S. PATENT DOCUMENTS

| | | | |
|---|---|---|---|
| 4,742,441 A | 5/1988 | Akerson | |
| 5,014,178 A | 5/1991 | Balakrishnan | |
| 5,285,369 A | 2/1994 | Balakrishnan | |
| 5,313,381 A | 5/1994 | Balakrishnan | |
| 5,359,274 A | 10/1994 | Bandel | |
| 5,481,178 A | 1/1996 | Wilcox et al. | |
| 5,513,088 A | 4/1996 | Williamson | |
| 5,731,694 A | 3/1998 | Wilcox et al. | |
| 5,812,386 A | 9/1998 | Youn | |
| 5,852,550 A | 12/1998 | Majid et al. | |
| 5,949,226 A | 9/1999 | Tanaka et al. | |
| 5,994,885 A | 11/1999 | Wilcox et al. | |
| 6,023,156 A | 2/2000 | Buhler | |
| 6,088,244 A | 7/2000 | Shioya et al. | |
| 6,157,182 A | 12/2000 | Tanaka | |
| 6,198,637 B1* | 3/2001 | Hosotani ............ H02M 3/3381 363/19 | |
| 6,212,079 B1 | 4/2001 | Balakrishnan et al. | |
| 6,226,190 B1 | 5/2001 | Balakrishnan et al. | |
| 6,275,018 B1 | 8/2001 | Telefus et al. | |
| 6,297,623 B1 | 10/2001 | Balakrishnan et al. | |
| 6,304,066 B1 | 10/2001 | Wilcox et al. | |
| 6,333,862 B1 | 12/2001 | Lee et al. | |
| 6,339,314 B1 | 1/2002 | Bruning | |
| 6,414,863 B1 | 7/2002 | Bayer et al. | |
| 6,480,401 B2 | 11/2002 | Tang | |
| 6,519,166 B1 | 2/2003 | Li | |
| 6,525,514 B1 | 2/2003 | Balakrishnan et al. | |
| 6,529,354 B1 | 3/2003 | Shteynberg et al. | |
| 6,580,258 B2 | 6/2003 | Wilcox et al. | |
| 6,661,679 B1 | 12/2003 | Yang et al. | |
| 6,714,425 B2 | 3/2004 | Yamada et al. | |
| 7,075,802 B2 | 7/2006 | Yamashita | |
| 7,106,602 B2 | 9/2006 | Mabanta et al. | |
| 7,245,510 B2 | 7/2007 | Bäurle et al. | |
| 7,272,018 B2 | 9/2007 | Yamada et al. | |
| 7,272,025 B2 | 9/2007 | Hawley | |
| 7,279,876 B2 | 10/2007 | Adragna et al. | |
| 7,301,319 B2 | 11/2007 | Balakrishnan et al. | |
| 7,313,004 B1 | 12/2007 | Yang et al. | |
| 7,321,223 B2 | 1/2008 | Hachiya | |
| 7,332,900 B2 | 2/2008 | Currell | |
| 7,345,462 B2 | 3/2008 | Balakrishnan et al. | |
| 7,345,894 B2 | 3/2008 | Sawtell et al. | |
| 7,348,766 B2 | 3/2008 | Hachiya et al. | |
| 7,369,418 B2 | 5/2008 | Balakrishnan | |
| 7,405,954 B2 | 7/2008 | Bäurle et al. | |
| 7,411,137 B2 | 8/2008 | Sandberg et al. | |
| 7,411,317 B2 | 8/2008 | Liu | |
| 7,423,893 B2 | 9/2008 | Kögel et al. | |
| 7,453,709 B2 | 11/2008 | Park et al. | |
| 7,471,530 B2 | 12/2008 | Balakrishnan et al. | |
| 7,478,254 B2 | 1/2009 | Kawai | |
| 7,542,308 B2 | 6/2009 | Yamada | |
| 7,619,903 B2 | 11/2009 | Choi | |
| 7,755,342 B2* | 7/2010 | Chen ............... H02M 3/156 323/271 | |
| 7,843,179 B2 | 11/2010 | Hasegawa et al. | |
| 7,952,895 B2 | 5/2011 | Matthews | |
| 7,957,162 B2 | 6/2011 | Choi et al. | |
| 7,995,359 B2 | 8/2011 | Djenguerian et al. | |
| 8,159,839 B2 | 4/2012 | Matthews | |
| 8,194,421 B2 | 6/2012 | Djenguerian et al. | |
| 8,385,088 B2 | 2/2013 | Bailey et al. | |
| 8,519,693 B2 | 8/2013 | Matthews | |
| 8,599,582 B2 | 12/2013 | Bailey et al. | |
| 2002/0075085 A1 | 6/2002 | Nishida et al. | |
| 2004/0263140 A1 | 12/2004 | Adragna et al. | |
| 2006/0098462 A1 | 5/2006 | Usui | |
| 2007/0070558 A1 | 3/2007 | Liu | |
| 2008/0007240 A1 | 1/2008 | Hawley | |
| 2008/0239762 A1 | 10/2008 | Jacques et al. | |
| 2009/0153123 A1* | 6/2009 | Kraft ............... H02M 1/32 323/285 | |
| 2009/0154206 A1 | 6/2009 | Fouquet et al. | |
| 2009/0289612 A1 | 11/2009 | Hojo et al. | |
| 2009/0295346 A1* | 12/2009 | Matthews ............ H02M 3/00 323/267 | |
| 2010/0195355 A1 | 8/2010 | Zheng | |
| 2010/0208500 A1 | 8/2010 | Yan et al. | |
| 2010/0225293 A1 | 9/2010 | Wang et al. | |
| 2010/0302812 A1 | 12/2010 | Moon et al. | |
| 2012/0218786 A1 | 8/2012 | Djenguerian et al. | |
| 2013/0286691 A1 | 10/2013 | Matthews | |
| 2015/0062980 A1 | 3/2015 | Djenguerian et al. | |

FOREIGN PATENT DOCUMENTS

| | | |
|---|---|---|
| CN | 101272094 A | 9/2008 |
| CN | 101847932 A | 9/2010 |
| EP | 0980133 A2 | 2/2000 |
| JP | H 08-340670 A | 12/1996 |
| JP | H 09-117135 A | 5/1997 |
| JP | 2001-157450 A | 6/2001 |
| JP | 2001-238441 A | 8/2001 |
| JP | 2002-136120 A | 5/2002 |
| JP | 2002-369499 A | 12/2002 |
| JP | 2004-187355 A | 7/2004 |
| JP | 2006-037967 A | 2/2006 |
| JP | 2006-136034 | 5/2006 |
| JP | 2006-230124 A | 8/2006 |
| JP | 2006-280184 A | 10/2006 |
| JP | 2008-092793 A | 4/2008 |
| JP | 4-285464 B2 | 6/2009 |
| WO | WO 2004/059822 A1 | 7/2004 |
| WO | WO 2005/006527 A1 | 1/2005 |

OTHER PUBLICATIONS

"ACT353", Active-Semi, Inc., Rev. PrA, Aug. 19, 2007, pp. 2-9.
"AP3700E Low Power PWM Controller for Off-line Battery Charger", BCD Semiconductor Manufacturing Ltd., Rev. 1.0, Dec. 2007, pp. 1-12.
"AP3706 Primary Side Control IC for Off-line Battery Chargers", BCD Semiconductor Manufacturing Ltd., Rev. 1.0, Feb. 2008, pp. 1-12.
"C2472, C2473 and C2474 Datasheet: RDFC Controllers for Offline Applications", Cambridge Semiconductor Ltd., Version DS-1423-0709C, Sep. 26, 2007, pp. 1-18.
"FSDM0465RE, FSDM0565RE, FSDM07652RE—Green Mode Fairchild Power Switch (FPS™)", Fairchild Semiconductor Corp., Rev. 1.0.2, Oct. 2007, pp. 1-20.
"FSEZ1216—Primary-Side-Regulation PWM Controller Integrated Power MOSFET", Fairchild Semiconductor Corp., Rev. 0.1, Mar. 2008, pp. 1-12.

(56) References Cited

OTHER PUBLICATIONS

"FSQ0565R, FSQ0765R—Green-Mode Fairchild Power Switch (FPS™) for Quasi-Resonant Operation—Low EMI and High Efficiency", Fairchild Semiconducfor Corp., Rev. 1.0.0, Oct. 2007, pp. 1-22.
"ICE3B0365J, ICE3B0565J, ICE3B1565J—CoolSET™—F3 (Jitter Version): Off-Line SMPS Current Mode Controller with Integrated 650V Startup Cell/Depletion CoolMOS™", Infineon Technologies AG, Version 2.3, May 8, 2006, pp. 1-26.
"ICE3A(B)0365/0565/1065/1565; ICE3A(B)2065/2565; ICE3A0565Z/2065Z; ICE3A(B)2065I/3065I/3565I; ICE3A(B)5065I/5565I; ICE3A(B)2065P/3065P/3565P; ICE3A(B)5065P/5565P—CoolSET™—F3: Off-Line SMPS Current Mode Controller with Integrated 650V Startup Cell/Depletion CoolMOS™", Infineon Technologies AG, Version 2.0, Aug. 24, 2005, pp. 1-31.
"iW1689—Low-Power Off-line Digital PWM Controller", iWatt, Inc., 2005, pp. 1-20.
"iW1690—Low-Power Off-line Digital PWM Controller", iWatt, Inc., Rev. 1.1, Jan. 14, 2008, pp. 1-12.
"iW1692—Low-Power Off-line Digital PWM Controller", iWatt, Inc., Version MK-4008-B, Nov. 20, 2007, pp. 1-18.
"L6566B—Multi-Mode Controller for SMPS", STMicroelectronics, Rev. 1, Aug. 2007, pp. 1-51.
"LD7576/76H/76J/76K—Green-Mode PWM Controller with High-Voltage Start-Up Circuit and Adjustable OLP Delay Time", Leadtrend Technology Corp., Rev. 3, Dec. 5, 2007, pp. 1-20.
"LT3825—Isolated No-Opto Synchronous Flyback Controller with Wide Input Supply Range", Linear Technology Corp., Rev. A, 2007, pp. 1-32.
"NCP1015—Self-Supplied Monolithic Switcher for Low Standby-Power Offline SMPS", ON Semiconductor®: Semiconductor Components Industries, LLC, Rev. 0, Jul. 2007, pp. 1-20.
"NCP1027—High-Voltage Switcher for Medium Power Offline SMPS Featuring Low Standby Power", ON Semiconductor®: Semiconductor Components Industries, LLC, Rev. 2, Jun. 2006, pp. 1-30.
"NCP1028—High-Voltage Switcher for Medium Power Offline SMPS Featuring Low Standby Power", ON Semiconductor®: Semiconductor Components Industries, LLC, Rev. 0, Jan. 2007, pp. 1-29.
"NCP1030, NCP1031—Low Power PWM Controller with On-Chip Power Switch and Start-Up Circuits for 48 V Telecom Systems", ON Semiconductor®: Semiconductor Components Industries, LLC, Rev. 2, Sep. 2003, pp. 1-18.
"NCP1201—PWM Current-Mode Controller for Universal Off-Line Supplies Featuring Low Standby Power with Fault Protection Modes", ON Semiconductor®: Semiconductor Components Industries, LLC, Rev. 0, Jul. 2003, pp. 1-18.
"NCP1230—Low-Standby Power High Performance PWM Controller", ON Semiconductor®: Semiconductor Components Industries, LLC, Rev. 1, Jun. 2004, pp. 1-22.
"NCP1337—PWM Current-Mode Controller for Free Running Quasi-Resonant Operation", ON Semiconductor®: Semiconductor Components Industries, LLC, Rev. P0, Oct. 2005, pp. 1-16.
"0B2358—Current Mode PWM Power Switch", On-Bright Electronics Corp., Version OB_DOC_DS_5800, pp. 1-10.
"SG6741—Highly-Integrated Green-Mode PWM Controller", System General Corp., Version 1.1, Nov. 17, 2006, pp. 1-13.
"SG6859A—Low-Cost, Green-Mode PWM Controller for Flyback Converters", Fairchild Semiconductor Corp., Rev. 1.0.0, Mar. 2008, pp. 1-12.
"SG6860—Low-Cost, Green-Mode PWM Controller for Flyback Converters", Fairchild Semiconductor Corp., Rev. 1.0.1, Mar. 2008, pp. 1-11.
"SGP100—Primary-Side-Control PWM Controller", System General Corp., Version 1.0, Sep. 7, 2006, pp. 1-14.
Van den Broek, V., "STARplug™—Efficient Low Power Supply with the TEA152x", Philips Semiconductors: Philips Electronics N.V., Version 1.0, Application Note AN00055, Sep. 2000, pp. 1-42.
"News Release: Realizing Low Power Consumption (100mW max) at No Load—STR-A6200 Series—IC's for Switching Mode Power Supplies (SMPS)", STR-A6200 Datasheet, Sanken Electric Co., Ltd., Mar. 23, 2005, pp. 1-5.
"TEA1541—SMPS Control IC with Synchronization Function", Philips Semiconductors: Koninklijke Philips Electronics N.V., Aug. 11, 2003, pp. 1-19.
"TEA1654—GreenChip™ II SMPS Control IC", Philips Semiconductors: Koninklijke Philips Electronics N.V., May 12, 2003, pp. 1-24.
"THX203H—Switching Power Controller IC", THX Micro-Electronics, Sep. 1, 2006, pp. 1-42 (English translation attached).
"VIPer12ADIP-E, VIPer12AS-E—Low Power Off-Line SMPS Primary Switcher", STMicroelectronics, Rev. 1, Jan. 2006, pp. 1-21.
"VIPER17—Off-line High Voltage Converters", STMicroelectronics, Rev. 2, Feb. 2008, pp. 1-31.
"VIPer22ADIP-E, VIPer22AS-E—Low Power Off-Line SMPS Primary Switcher", STMicroelectronics, Rev. 1, Feb. 2006, pp. 1-20.
"VIPer53EDIP-E, VIPer53ESP-E—Off-Line Primary Switch", STMicroelectronics, Rev. 1, Jan. 2006, pp. 1-31.
"RD-166—Load Detecting Power Supply", National Semiconductor, Nov. 2008, pp. 1-16.
CN 201010111860.4—First Office Action with Search Report, dated Aug. 31, 2012, with English Translation (20 pages).
CN 201010111860.4—Decision on Rejection, dated Mar. 1, 2013, with English Translation (18 pages).
CN 200910141323.1—First Office Action with Search Report, issued Mar. 5, 2013, with English Translation (13 pages).
KR 10-2011-128999—Notice of Preliminary Rejection, dated Feb. 27, 2013, with English Translation (4 pages).
JP 2009-129070—Notice of Grounds of Rejection, dated Aug. 20, 2013, with English Translation (5 pages).
JP 2010-022902—Notice of Grounds of Rejection, dated Aug. 20, 2013, with English Translation (7 pages).
CN 200910141323.1—Office Action, dated Nov. 5, 2013, with English Translation (17 pages).
CN 201110399342.1—Office Action, dated Dec. 2, 2013, with English Translation (29 pages).
EP 10151712.6—European Search Report, dated Mar. 12, 2014 (3 pages).
EP 10151712.6—European Office Action, dated Jul. 17, 2014 (5 pages).
JP 2010-022902—Final Decision for Rejection, dated May 7, 2014, with English Translation (7 pages).
JP 2009-129070—Final Decision for Rejection, dated May 7, 2014, with English Translation (4 pages).
CN 201110399342.1—Office Action, dated May 5, 2014, with English Translation (7 pages).
CN 200910141323.1—Office Action, dated Jun. 30, 2014, with English Translation (15 pages).
CN 201010111860.4—Reexamination Notice, dated Jul. 22, 2014, with English Translation (21 pages).
CN 201310231731.2—Office Action and Search Report, dated Dec. 31, 2014, with English Translation (17 pages).
JP 2010-022902—Pre-Trial Reexamination Report, dated Dec. 26, 2014, with English Translation (10 pages).
CN 200910141323.1—Office Action and Search Report, with English Translation, issued Jan. 26, 2015, (17 pages).
CN Patent Application No. 201010111860.4—Chinese Reexamination Decision, dated Mar. 26, 2015, with Machine and Human English Translations (59 pages).
CN Patent Application No. 200910141323.1—Chinese Rejection Decision, dated May 25, 2015, with English Translation (14 pages).
JP 2010-022902—Japanese Office Action, dated Jul. 7, 2015, with English Translation (7 pages).
CN Patent Application No. 201010111860.4—Chinese Office Action, dated Jul. 22, 2015, with English Machine Translation (6 pages).
JP 2014-181557—Japanese Office Action, dated Sep. 1, 2015, with English Translation (18 pages).
CN 201310231731.2—Office Action, dated Nov. 6, 2015, with English Translation (12 pages).
EP 10151712.6—European Office Action, dated Sep. 4, 2015 (6 pages).

(56) References Cited

OTHER PUBLICATIONS

CN Patent Application No. 200910141323.1—Chinese Office Action, dated Feb. 16, 2016, with English Machine Translation (19 pages).
CN Patent Application No. 201010111860.4—Chinese Office Action, dated Feb. 1, 2016, with English Machine Translation (20 pages).
JP Patent Application No. 2010-022902—Japanese Office Action, dated Mar. 1, 2016, with English Machine Translation (8 pages).
CN Patent Application No. 201310231731.2—Chinese Office Action, dated Jul. 13, 2016, with English Machine Translation (11 pages).
JP Patent Application No. 2010-022902—Japanese Office Action, dated Oct. 18, 2016, with English Machine Translation (28 pages).
CN Patent Application No. 201310231731.2—Chinese Office Action, dated Jan. 23, 2017, with English Machine Translation (13 pages).
CN Patent Application No. 201010111860.4—Chinese Office Action, dated Jan. 5, 2017, with English Machine Translation (20 pages).
JP Patent Application No. 2010-022902—Japanese Office Action (Board Decision), dated May 16, 2017, with English Machine Translation (74 pages).
PRC (China) Patent Application No. 201310231731.2—Chinese Office Action and Machine Translation dated Sep. 8, 2017, 14 pages.
PRC (China) Patent Application No. 201010111860.4—Chinese Office Action and Machine Translation dated Sep. 20, 2017, 22 pages.
Indian Patent Application No. 930/DEL/2009—Indian Office Action dated Sep. 28, 2017, 6 pages.
Indian Patent Application No. 150/DEL/2010—Indian Office Action dated Jan. 24, 2018, 6 pages.
PRC (China) Patent Application No. 201310231731.2—Chinese Office Action and Machine Translation dated Apr. 17, 2018, 12 pages.
CN Patent Application No. 201010111860.4—Chinese Office Action, dated Jun. 27, 2018, with English Machine Translation (24 pages).
European Patent Application No. 18163117.7—Extended European Search Report dated Jun. 6, 2018, 9 pages.

* cited by examiner

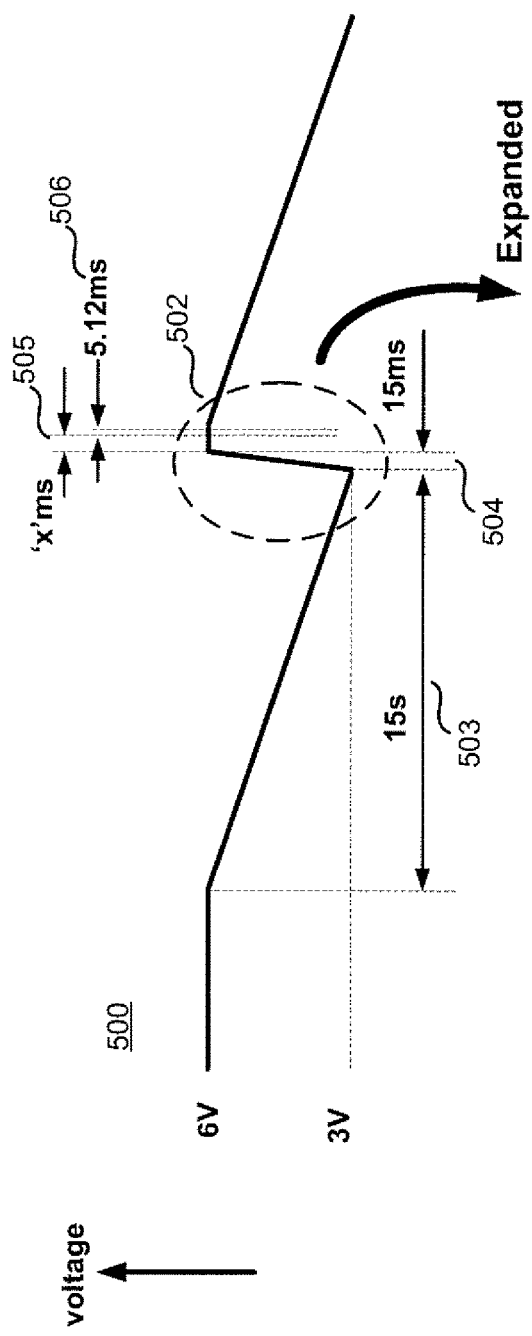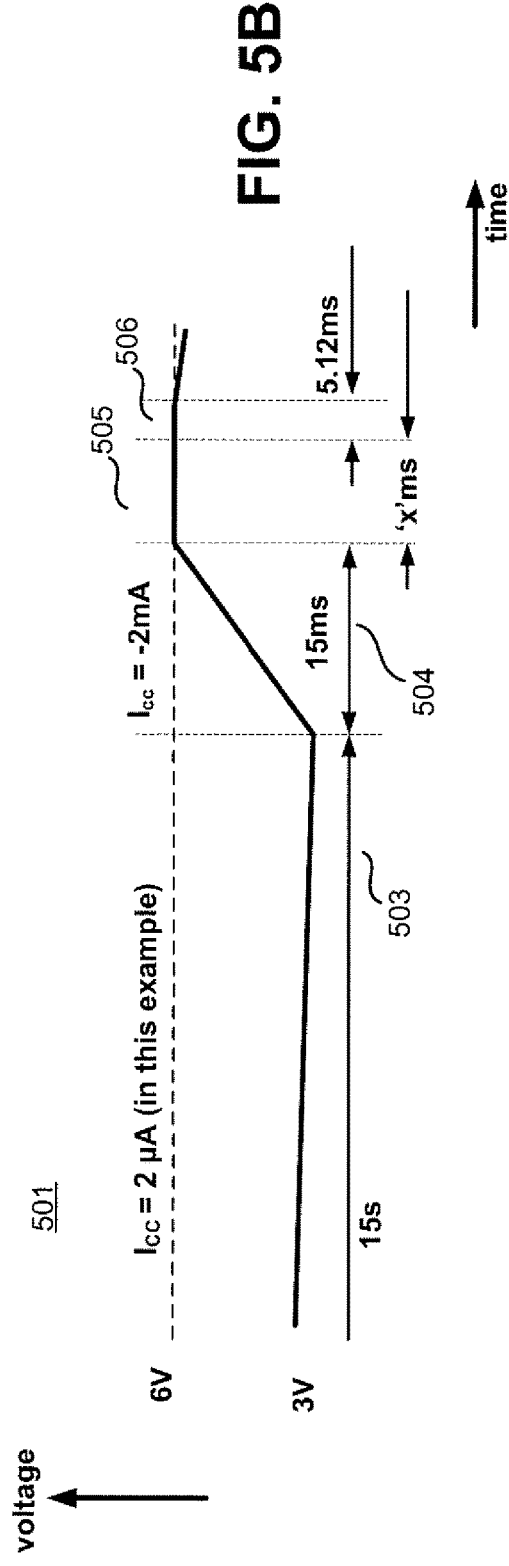

METHOD AND APPARATUS FOR IMPLEMENTING AN UNREGULATED DORMANT MODE WITH AN EVENT COUNTER IN A POWER CONVERTER

CROSS-REFERENCE TO RELATED APPLICATIONS

This application is a continuation of U.S. patent application Ser. No. 15/246,138, filed Aug. 24, 2016, now pending, which is a continuation of U.S. patent application Ser. No. 14/535,730, filed Nov. 7, 2014, now U.S. Pat. No. 9,484,822, which is a continuation of U.S. patent application Ser. No. 13/465,882, filed May 7, 2012, now U.S. Pat. No. 8,908,395, which is a continuation of U.S. patent application Ser. No. 13/170,018, filed Jun. 27, 2011, now U.S. Pat. No. 8,194,421, which is a continuation of U.S. patent application Ser. No. 12/366,574, filed Feb. 5, 2009, now U.S. Pat. No. 7,995,359. U.S. patent application Ser. No. 15/246,138, and U.S. Pat. Nos. 9,484,822, 8,908,395; 8,194,421; and 7,995,359 are hereby incorporated by reference.

This application is related to U.S. patent application Ser. No. 12/129,474, filed May 29, 2008, now U.S. Pat. No. 7,952,895.

This application is also related to U.S. patent application Ser. No. 12/961,241, filed Dec. 6, 2010, now U.S. Pat. No. 8,385,088.

BACKGROUND INFORMATION

Field of the Disclosure

The present invention relates generally to control circuits that regulate the delivery of energy in a switched mode power converter and, more specifically, the present invention relates to control circuits that reduce the energy consumption of switched mode power converters under light or no load conditions by use of an unregulated dormant mode of operation.

Background

Power converter control circuits may be used for a multitude of purposes and applications. There is a demand for control circuit functionality that can reduce the energy consumption of the power converter. In particular, there is specific demand for control circuits that reduce the energy consumption of power converters under conditions of light or no load. This demand comes from the fact that in some applications of power converters there is little or no requirement for energy delivery at all for long periods of time. One example of such an application is in AC-DC chargers for cellular telephones. The AC-DC charger is often left connected to the AC mains outlet in the home or office, even when the cellular phone itself is completely disconnected from the output cable of the AC-DC charger. Such a condition is often referred to as a no-load condition. Furthermore in applications such as cellular telephones and digital still cameras and the like, the unit being powered by the output of the AC-DC charger shuts down once the battery internal to the unit is fully charged. Under these conditions the energy requirement of the unit falls dramatically and is therefore a very light load condition for the AC-DC charger. This condition is often referred to as a standby or sleep mode and again can exist for long periods. There is therefore also demand for the AC-DC charger to operate with high efficiency or in other words with the lowest possible energy consumption under these very light load standby or sleep mode conditions.

Existing control circuits for switched mode power converters typically reduce the energy consumption of the power converter by reducing the switching frequency of a power switch coupled to the control circuit, to reduce a type of energy loss called switching losses. During this time of reduced switching frequency, the control circuits remain active by maintaining a power converter output voltage such that the unit to be powered (the cellular telephone handset or digital still camera for example) can receive energy as soon as it is connected to the AC-DC charger output or as soon as it comes out of sleep/standby mode and demands more energy.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 5A and 5B shows example waveforms that in one example are from a control circuit with the block diagram of FIG. 4A.

DETAILED DESCRIPTION

Figure 1:
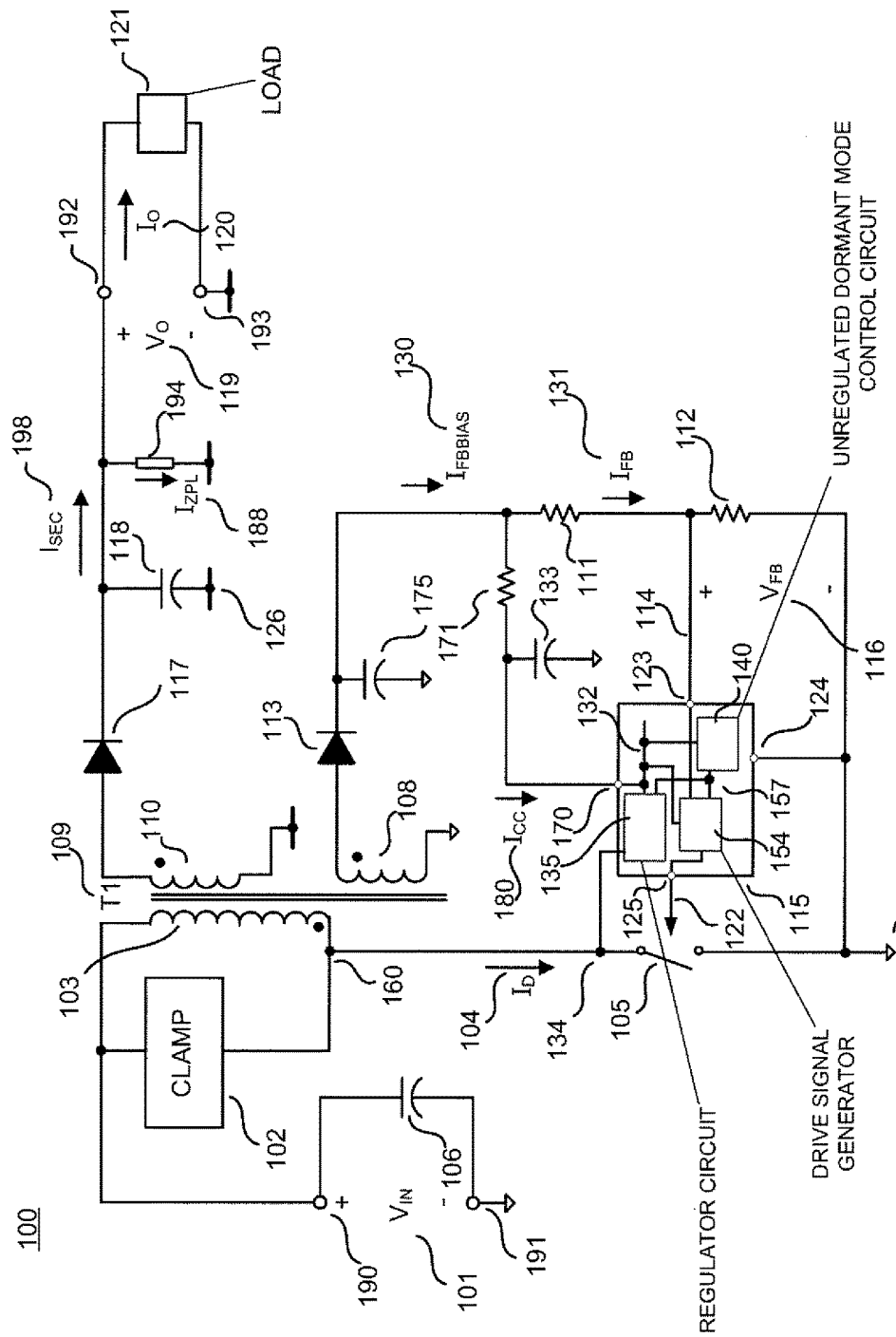
FIG. 1 is a schematic illustrating generally an example flyback power converter employing an example of a control circuit that reduces the energy consumption of the power converter under light or no load conditions by use of an unregulated dormant mode of operation in accordance with the teachings of the present invention.

Methods and apparatuses for implementing a control circuit for reducing the energy consumption of a power converter under light or no load conditions by use of an unregulated dormant mode of operation are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

A control circuit for reducing the energy consumption of a power converter under light or no load conditions by use of an unregulated dormant mode of operation will now be described. Examples of the present invention involve methods and apparatuses to implement an unregulated dormant mode of operation to reduce the energy consumption of a power converter under light or no load conditions. The following description will detail a number of example control circuits used in a variety of power converter circuits that regulate energy flow from an input of the power converter to the output of the power converter under normal operating conditions, which could be for example when a cellular telephone is connected to the output of the power converter and is charging its battery. The flow of energy from input to the output of the power converter can also be described in terms of energy flow through an energy transfer element, which may include a transformer within the power converter but could be a simple inductor in some power converter configurations. The description will detail how the example control circuits described transition to a mode of operation where energy flow from input to output of the power converter is no longer regulated when the output of the power converter is identified as being in a no-load or very light load condition, for example when the cellular telephone is physically disconnected from the output of the AC-DC charger in which the control circuit is used. Under these conditions, the transfer of energy from input to output of the power converter is substantially reduced to zero for a period of time that is programmed by the user of the control circuit or is preprogrammed using a timer circuit inside the control circuit itself. During this period of time the circuit is in the unregulated dormant mode of operation referred to in the title of this disclosure. During this unregulated dormant mode time period, the power consumption of the control circuit itself is reduced as much as possible to conserve energy. The description will detail how, after this unregulated dormant mode period of operation, the control circuit will restart and again regulate energy flow from the input of the power converter to the output of the power converter. If however the very light load or no-load condition is still present, the control circuit will again detect this and again initiate a period of unregulated dormant mode operation.

To illustrate, FIG. 1 shows generally a schematic of a power converter 100, also sometimes referred to as a power supply, employing a control circuit 115 that regulates energy flow through the energy transfer element 109. In the illustrated example, control circuit 115 includes an unregulated dormant mode control circuit 140 employed to reduce the energy consumption of the power converter 100 under light or no load conditions by use of an unregulated dormant mode of operation in accordance with the teachings of the present invention. In one example, power converter 100 is an isolated flyback converter where primary ground 107 and secondary return 126 are electrically isolated from one another. It is noted that in other examples power converter 100 could be non-isolated with primary ground 107 and secondary return 126 electrically connected together in accordance with the teachings of the present invention. Other non-isolated power converter configurations that could benefit from the teachings of the present invention could further include buck, CUK or SEPIC converters. It is further noted that in other examples, power converter 100 could have more than one output in accordance with the teachings of the present invention.

As shown in the illustrated example, a control circuit 115 includes a drive signal generator block 154, which generates a drive signal 122 that is to be coupled to drive a power switch 105. In one example, power switch 105 is a metal oxide semiconductor field effect transistor (MOSFET), a bipolar transistor or the like. Power switch 105 is coupled to the input winding 103 of energy transfer element 109, which is coupled to a DC input voltage 101 and an output power diode 117. In one example, DC input voltage 101 is the output of a rectifier circuit coupled to a source of AC voltage not shown. Capacitor 106 is coupled to power converter input terminals 190 and 191 to provide a low impedance source for switching currents flowing through first and second input terminals 190 and 191, energy transfer element 109 winding 103 and power switch 105 when the power switch 105 is in an ON state. In one example, control circuit 115 and switch 105 could form part of an integrated circuit that could be manufactured as a hybrid or monolithic integrated circuit. As shown in the depicted example, control circuit 115 is coupled to receive a feedback signal 114, which in one example is a voltage signal, but in other examples could also be a current signal, or other signal representative of a parameter of the power converter 100 output, while still benefiting from the teachings of the present invention.

When power converter 100 is first connected to the input voltage supply 101 in the illustrated example, control circuit 115 derives start up current to initiate operation of the control circuit. This is achieved by charging up an external bypass capacitor 133 coupled to bypass terminal 170. In the example of FIG. 1 this start up current is derived from the high voltage connection node 134 of power switch 105 and coupled to a regulator circuit 135 internal to control circuit 115. An output 132 from regulator circuit 135 is coupled to an external bypass capacitor 133 and is also the voltage supply rail for the circuitry internal to control circuit 115. In another example, the connection node 134 could instead be coupled to input terminal 190 or to a node internal to the structure of power switch 105 in the case that power switch 105 and control circuit 115 are integrated on a single die and/or incorporated within a single semiconductor package.

In the illustrated example, regulator circuit 135 converts the high voltage present on node 134, which in one example is typically in the range of 50 to 400V relative to primary ground 107, and regulates the maximum voltage on rail 132 to a lower voltage, which can be used to operate the control circuit 100. Initially the voltage across bypass capacitor 133 is substantially zero and the regulator circuit 135 provides current to charge up bypass capacitor 133. When the voltage on bypass capacitor 133 is sufficient for correct operation of control circuit 115, which in one example is typically in the order of 6 Volts, an internal under-voltage circuit, not shown, enables control circuit 115 to start operation, which initiates switching of power switch 105 with drive signal 122. This, in turn, initiates the flow of energy from input terminals 190 and 191 through energy transfer element 109.

Energy transfer element 109 includes input winding 103 and output winding 110 and a low voltage (which in one example is typically in the range 10 to 30V) auxiliary winding 108. The feedback signal 114 is coupled to control circuit 115 from auxiliary winding 108 through the resistor divider formed by resistors 111 and 112. In addition, when auxiliary winding capacitor 175 is sufficiently charged, the control circuit 115 receives the supply current 180 for the control circuit 115 to operate through resistor 171. In the illustrated example, deriving current from the low voltage auxiliary winding 108 in this way is more efficient than regulator circuit 135 deriving current from the high voltage node 134. As such, the operation of regulator circuit block 135 is typically disabled when supply current Icc 180 is available through resistor 171.

In one example, control circuit 115 includes a drive signal generator 154 to generate a drive signal 122, which is to be coupled to drive power switch 105 to regulate energy flow through energy transfer element 109 by regulating the frequency at which power switch 105 is switched on and off in response to the feedback signal 114. This switching frequency regulation can be achieved in a number of ways including varying the frequency of an oscillator, not shown, within control circuit 115, selectively enabling and disabling switching cycles of power switch 105 derived from a fixed frequency oscillator within control circuit 115 (often to referred to as on/off control) varying an off time of the power switch 105 with a fixed on time of power switch 105 or varying an on time of the power switch 105 with a fixed off time of power switch 105. When switch 105 is on, energy from the capacitor 106 is transferred into the input winding 103 of the energy transfer element 109. When the switch is off, the energy stored in the input winding 103 is transferred to the output winding 110 and to auxiliary winding 108. The energy from output winding 110 is transferred to the output of the power supply 100 with a current that flows through a forward biased output power diode 117 to capacitor 118, a load 121 coupled to preload impedance 194 and the output terminals 192 and 193. Since, in this example, switching frequency is the variable used to regulate energy flow, the frequency at which the power switch 105 is switching is therefore a measure of the total energy flowing through energy transfer element 109.

In the example of FIG. 1, control circuit 115 is coupled to regulate the total energy delivered from the first and second input terminals 190 and 191 of power converter 100 through energy transfer element 109 to the power converter output terminals 192 and 193, the preload impedance 194, the control circuit supply terminal 170 and the feedback components 111 and 112 in addition to the feedback terminal 123. In an example cellular telephone charger providing a full load output power to load 121 of 3 Watts (an energy of 3 Joules per second), the energy consumed by the preload 194, control circuit 115 supply current 180 and feedback current 131 is typically less than 1% of the energy consumed by load 121. In one example preload 194 is removed altogether. However, if output load current 120 is substantially eliminated by either physically disconnecting load 121 or when load 121 is in a standby mode of operation, the combined energy consumption of the preload 194 if present, control circuit 115 supply current 180 and feedback current 131 can become substantially 100% of the energy flowing through energy transfer element 109.

Since, as described above, in the example of FIG. 1, switching frequency of power switch 105 is the variable used to regulate energy flow through energy transfer element 109, the switching frequency is therefore an indication of the total energy requirement or demand of the circuitry coupled to the windings 108 and 110 of energy transfer element 109. Therefore, in the illustrated example, when the switching frequency of power switch 105 falls below a threshold value, it is used as an indication that output current 120 has been reduced to substantially zero and that a no-load or very light load condition therefore exists where load 121 is requiring substantially no energy. In other words, when the energy requirements of load 121 falls below a threshold value a no-load or very light load condition has been identified.

Under these conditions, control circuit 115 in one example includes unregulated dormant mode control circuit 140, which, if the energy requirements of load 121 have fallen below a threshold value for longer than a threshold period of time, is coupled to generate a power down/reset signal 157 coupled to render dormant the drive signal generator 154 by powering down the drive signal generator 154 for a period of time. During this period of time while the drive signal generator 154 is powered down, the drive signal generator 154 no longer generates drive signal 122 and no longer regulates the energy flow through the energy transfer element 109. In one example, the duration of the period of time for which drive signal generator 154 is powered down and the switching of power switch 105 is disabled is determined by the length of time it takes for bypass capacitor 133 to discharge from its normal operating voltage, which in one example is in the range of 5.8 to 6.4 Volts, down to a lower voltage, which in one example could be 3 Volts. During this time, output capacitor 118 also discharges through preload impedance 194 and output voltage 119 also therefore falls. Thus, in this example, bypass capacitor 133 also functions as part of a timer to determine a time period in response to the indication that output current 120 has been reduced to substantially zero and that a no-load or very light load condition therefore exists. During this time, capacitor 175 also discharges through resistors 171 and 111 and the voltage across capacitor 175 also therefore falls. It is appreciated that in another example, the duration of the period of time for which drive signal generator 154 is powered down and the switching of power switch 105 is disabled could be determined by a timer circuit comprising a capacitor external to control circuit 115 but which is not the bypass capacitor 133. In a further example, the duration of the period of time for which drive signal generator 154 is powered down and the switching of power switch 105 is disabled could be determined by a timer circuit which is entirely integrated within control circuit 115 with no need for an external capacitor for this purpose.

In order to reduce the energy consumption of the control circuit as much as possible during this time period, internal regulator circuit block 135 is also powered down in response to the power down/reset signal 157 such that substantially no current flows from node 134 through regulator circuit 135 and the energy consumed by regulator circuit block 135 is substantially zero. During this unregulated dormant mode time period where the drive signal generator 154 of control circuit 115 ceases to regulate energy flow through energy transfer element 109, control circuit 115 is unresponsive to feedback signals received at terminal 123 until the unregulated dormant mode time period has elapsed. During this unregulated dormant mode period, therefore, in addition to powering down regulator circuit block 135, substantially all other circuitry inside control circuit 115 is also powered down and disconnected from supply rail 132 in response to power down/reset signal 157. This disconnection results in reduced power consumption and can be achieved using simple semiconductor load switches as will be known to one of ordinary skill in the art.

In one example an unregulated dormant mode time period is only initiated when the energy requirements of load 121 have fallen below a threshold value for longer than a threshold period of time, so that short term transient energy requirement conditions or events are not misinterpreted as no load conditions at the output of the power converter 100. In one example such a load transient event could be caused by a sudden change from full charging of a cellphone battery coupled to the output of power converter 100 as load 121, to trickle charging of the cellphone battery. This type of load transient often occurs in cellphone charging applications and can be followed very quickly by a sudden increase in load as the cellphone handset reverts back to full charging. Such load or energy requirement transients are controlled by the load 121 and are therefore changes of load 121 energy requirements to which the control circuit 115 must respond correctly. If the control circuit 115 immediately responded to a sudden reduction in load energy requirement, the control circuit 115 could have entered into an unregulated dormant mode period when the load again demanded increased energy which is not a desirable condition since in one example this could affect the speed with which a battery load is charged. By ensuring that the unregulated dormant mode time period is only initiated when the energy requirements of load 121 have fallen below a threshold value for longer than a threshold period of time, the risk of misinterpreting transient load events is reduced.

As will be discussed in greater detail below with reference to FIG. 4A, a circuit block that remains powered up in control circuit 115 is a portion of the unregulated dormant mode control circuit 140, which in one example includes an internal power up circuit block that detects when the voltage across bypass capacitor 133 falls to the 3V lower threshold. Thus, in the illustrated example, the unregulated dormant mode time period is considered to have elapsed when the voltage across bypass capacitor 133 falls to the 3V lower threshold, at which point the power up circuit block provides an internal reset signal inside the unregulated dormant mode control circuit 140 that resets the power down/reset signal 157 and reinitiates the control circuit 115 start up operation to power up the circuitry as described above with regard to when the input voltage supply 101 was first connected.

Therefore, in the illustrated example, bypass capacitor 133 is recharged when the control circuit 115 start up operation is reinitiated in response to the power down/reset signal 157. The bypass capacitor 133 is recharged using current flowing through regulator circuit 135 and when the voltage across bypass capacitor 133 again exceeds the under-voltage threshold voltage required for correct operation of the control circuit 115, which in one example is approximately 6V, drive signal generator 154 is powered up and drive signal 122 is generated to resume the switching of power switch 105. At this point, drive signal generator 154 is again responsive to feedback signals received at terminal 123 and energy again flows through energy transfer element 109 to replenish energy lost in capacitors 175 and 118. The switching frequency of power switch 105 will be high during this time. However, after the energy in capacitors 175 and 118 is replenished, if the load 121 still requires substantially no energy, the switching frequency will again fall below the threshold value and if this condition exists for longer than a threshold period of time, will again cause the power down/reset signal 157 to initiate a power down, which will again cause the drive signal generator 154 in control circuit 115 to cease the regulation of energy flow through energy transfer element 109 as described above. This operation of powering down and going dormant for a period of time, followed by a start up and resumed switching period, will repeat continuously until the energy requirement of load 121 again increases such that the switching frequency of power switch is maintained above the threshold value and the control circuit 115 then regulates the flow of energy through energy transfer element continuously according to the energy required by the total load on energy transfer element windings 108 and 110.

It is appreciated that in other examples of control circuit 115, following a period of unregulated dormant mode operation, the internal reset signal inside unregulated dormant mode control circuit 140 could initiate a low power restart sequence which consumes less energy than the normal start up when input voltage supply 101 is first connected. For instance, in one example, a low power restart sequence could include recharging bypass capacitor 133 to a value above the under-voltage threshold with current flowing through regulator circuit 135 as above. However, when switching of power switch 105 is resumed, output capacitor 118 could be partially recharged only enough to simply detect whether it is being discharged at a rate that indicates that a no-load condition at the output of power converter 100 still exists, in which case the unregulated dormant mode operating period would then be repeated. It is appreciated that this low power restart functionality would offer even further reduction in energy consumption, but could result in added complexity or cost to the overall power converter. The additional cost or complexity would result from the addition of circuitry to control circuit 115 to remember the fact that it had previously been in a low power unregulated mode of operation and also circuitry to detect a discharge rate of output capacitor 118, or some other way of detecting output current, at voltage conditions below the normal regulated value of output voltage 119.

It is noted that FIG. 1 shows that auxiliary winding 108 is a non-isolated winding of energy transfer element 109. Thus, it is appreciated therefore that the benefits of the teachings of the present invention may be applied to power converters that include energy transfer elements with isolated windings, non-isolated windings and combinations thereof. Examples of non-isolated windings include non-isolated sense windings, non-isolated bias windings, non-isolated output windings and the like. It is also noted that one or more loads may be coupled to the various windings of the energy transfer element in accordance with the teachings of the present invention. Indeed, FIG. 1 shows that both preload impedance 194 and load 121 are coupled to output winding 110 in the illustrated example. It is appreciated therefore the combinations of different one or more loads may be coupled to the different combinations of the windings of an energy transfer element resulting in many different load and winding configurations that may enjoy the benefits of a power converter including an unregulated dormant mode of operation in accordance with the teachings of the present invention.

For instance, in an example in which energy transfer element 109 includes a non-isolated sense winding, one of the one or more loads may be coupled to the non-isolated sense winding. In another example, one of the one or more loads may be coupled to an isolated output winding while another one of the one or more loads may be coupled to the non-isolated sense winding. In an example that includes a non-isolated bias winding, one or more of the loads may be coupled to the non-isolated bias winding. In another example, one of the one or more loads may be coupled to an isolated output winding while another one of the one or more loads may be coupled to the non-isolated bias winding. In an example in which the energy transfer element includes a non-isolated output winding, one of the one or more loads may be a combined sensing and bias load that is coupled to the non-isolated output winding. In an example in which the energy transfer element includes an isolated output winding and a non-isolated output winding, one of the one or more loads may be coupled to the isolated output winding and another one of the one or more loads may be a load that includes a combined sensing and bias load coupled to the non-isolated output winding.

Figure 2:
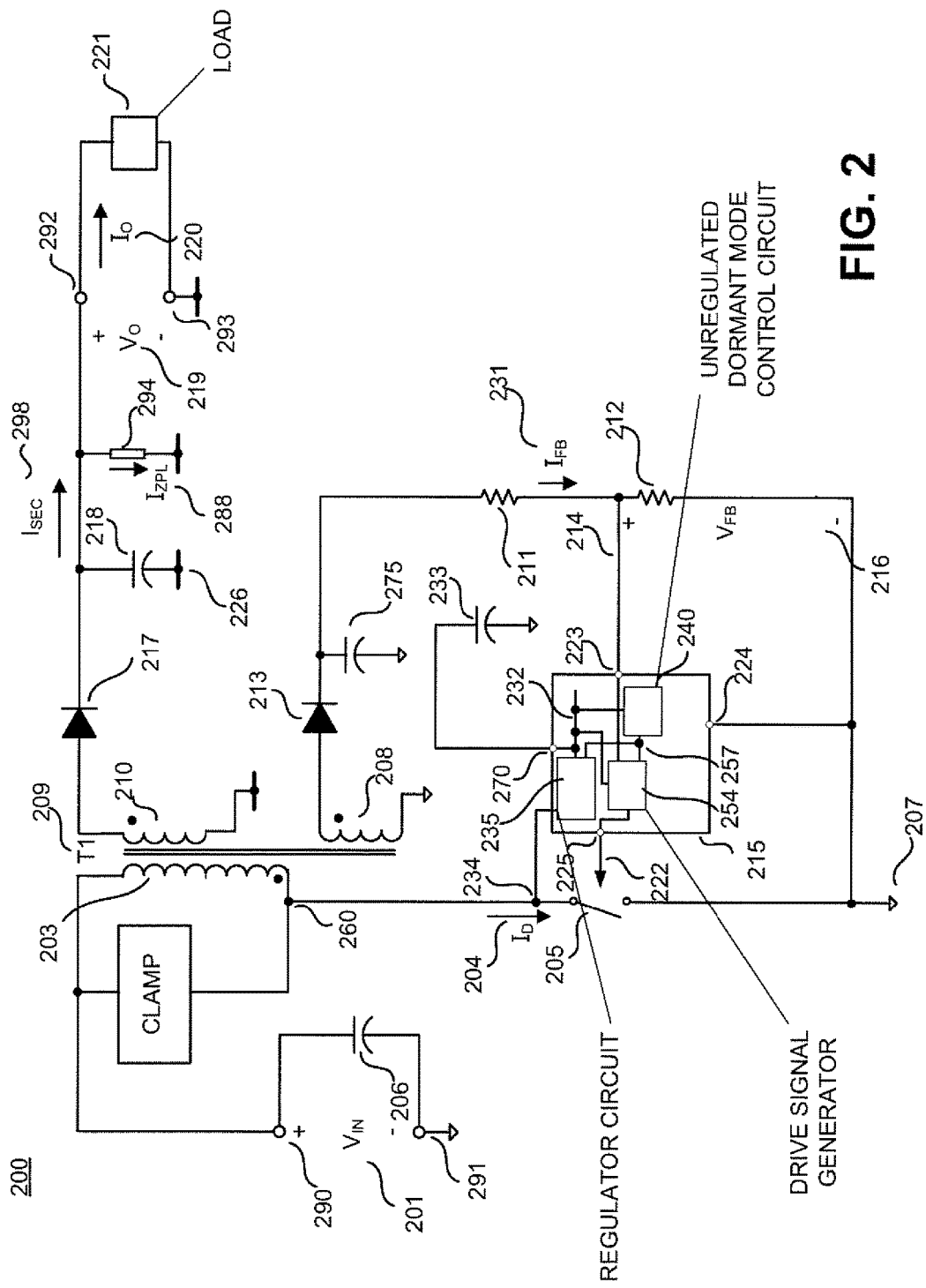
FIG. 2 is a schematic illustrating another example flyback power converter employing another example of a control circuit that reduces the energy consumption of the power converter under light or no load conditions by use of an unregulated dormant mode of operation in accordance with the teachings of the present invention.

FIG. 2 shows another example power converter circuit 200 using a control circuit 215 benefiting from the teachings of the present invention. The functionality of the power converter circuit example shares many aspects of the power converter circuit example described in FIG. 1. A difference compared to the circuit of FIG. 1 is that the resistor 171 is eliminated such that the operating current of control circuit 215 under normal operating conditions is derived entirely through regulator circuit 235. Energy transfer element winding 208 is therefore only used as a sense winding providing a feedback voltage across capacitor 275 which generates a feedback current $I_{FB}$ 231. However, the operation when the energy required by load 221 falls below a threshold value for more than a threshold period of time, which in one example is detected by the switching frequency of power switch 205 falling below a threshold value for more than a threshold period of time, is identical to that of the circuit of FIG. 1. Under those circumstances, an unregulated dormant mode of operation is initiated where regulator circuit 235 is disabled and substantially all circuit blocks other than a portion of the unregulated dormant mode control circuit 240 are disconnected from supply rail 232 while the voltage at external bypass capacitor 233 discharges from its normal operating voltage to the power up threshold voltage detected by unregulated dormant mode control circuit 240. In the example, the bypass capacitor 233 is then recharged to its normal operating voltage level, which in one example is approximately 6 Volts, and switching of power switch 205 is restarted.

Figure 3:
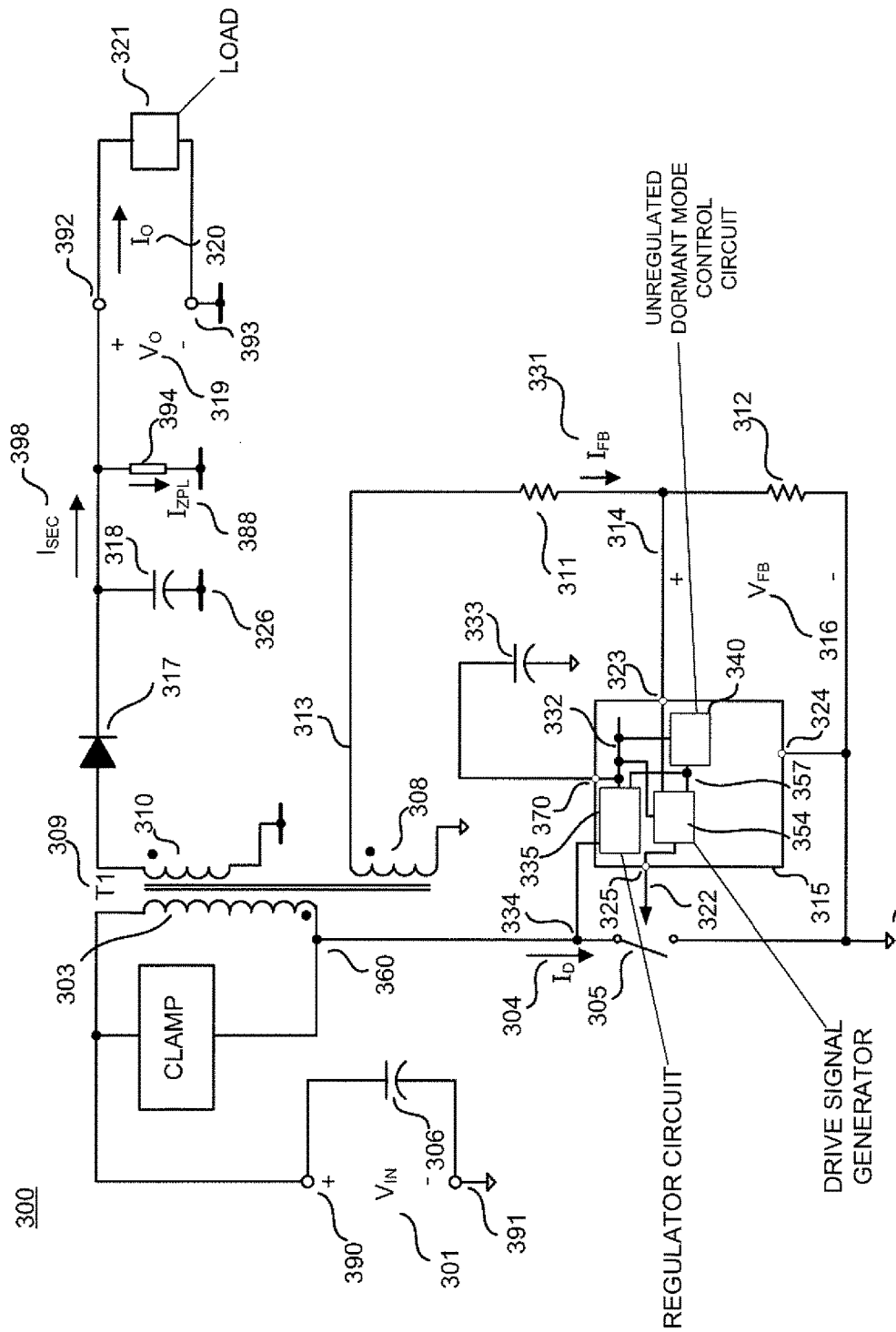
FIG. 3 is a schematic illustrating yet another example flyback power converter employing yet another example of a control circuit that reduces the energy consumption of the power converter under light or no load conditions by use of an unregulated dormant mode of operation in accordance with the teachings of the present invention.

FIG. 3 shows another example power converter circuit 300 using a control circuit 315 benefiting from the teachings of the present invention. The functionality of the example power converter 300 illustrated in FIG. 3 shares many aspects of the power converter circuit described in FIG. 2. A difference compared to the power converter circuit 200 of FIG. 2 is that the diode 213 and capacitor 275 are eliminated. In common with the power converter circuit 200 of FIG. 2, therefore, is that the operating current of control circuit 315 under normal operating conditions is derived through regulator circuit 335. Furthermore winding 308 of energy transfer element provides an AC voltage at node 313 relative to primary ground potential node 307. As a result, the feedback current $I_{FB}$ 331 has both positive and negative values during a switching cycle of the power switch 305. $I_{FB}$ 331 is a negative current during substantially all of the on time of power switch 305 and is a positive current for at least a portion of the off time of power switch 305. However, the operation when the energy required by load 321 falls below a threshold value for more than a threshold period of time, which in one example is detected by the switching frequency of power switch 305 falling below a threshold value for a predetermined period of time, is similar to that of the example power converter circuits of FIG. 1 and FIG. 2. Under those circumstances, an unregulated dormant mode of operation is initiated, where in one example, regulator circuit 335 is disabled and substantially all circuit blocks in control circuit 315 other than a portion of the unregulated dormant mode control circuit 340 are disconnected from supply rail 332 while the external bypass capacitor 333 voltage discharges from its normal operating voltage to a power up threshold voltage detected by unregulated dormant mode control circuit 340. The bypass capacitor 333 is then recharged to its normal operating voltage level, which in one example is approximately 5.8 Volts, and switching of power switch 305 is restarted.

Figure 4A:
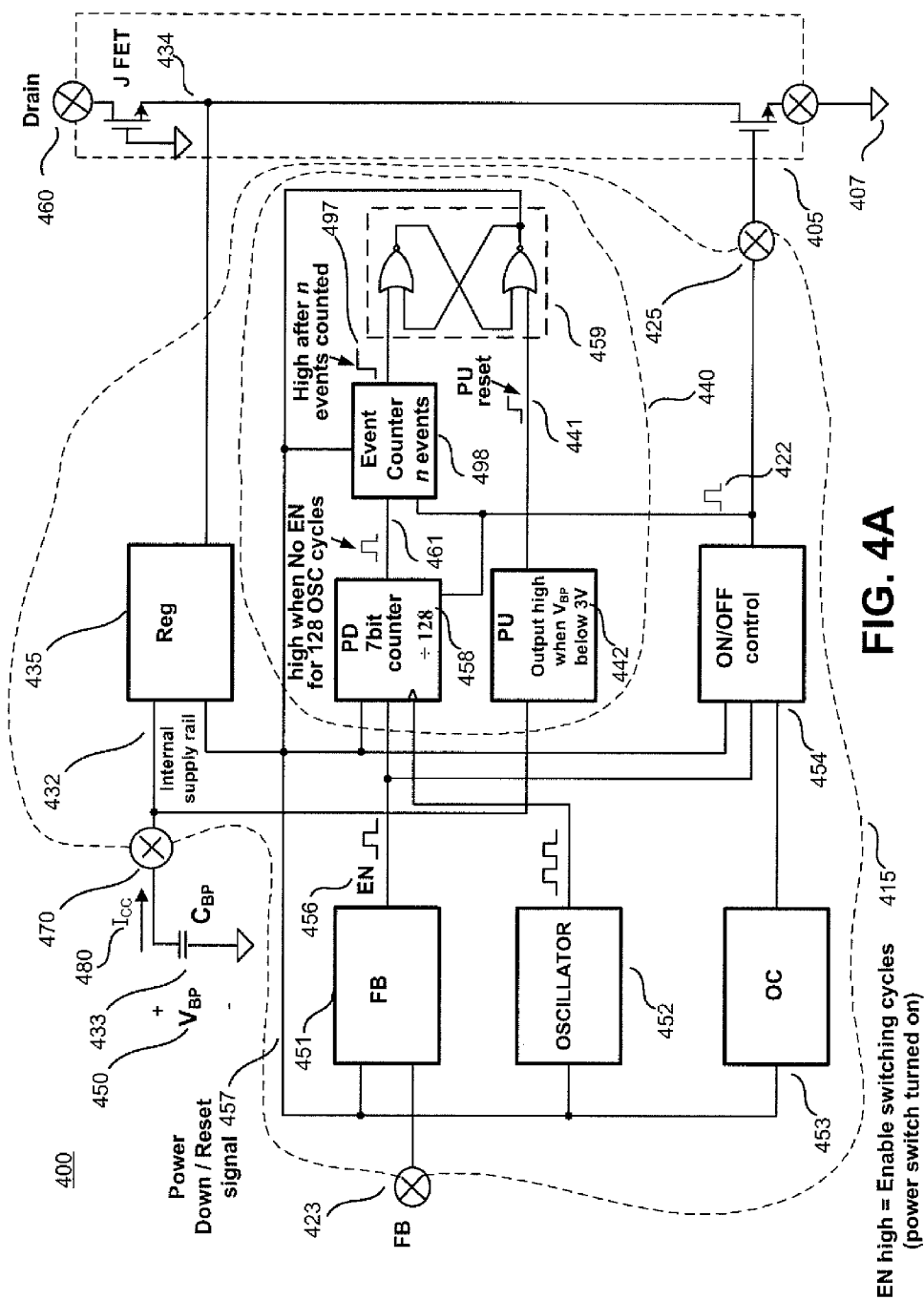
FIG. 4A is an example block diagram of a control circuit that reduces the energy consumption of a power converter under light or no load conditions in accordance with the teachings of the present invention.

FIG. 4A shows an example simplified block diagram 400 of a portion of a control circuit 415 that could be applied to any of the example control circuits 115, 215 or 315 in accordance with the teachings of the present invention. FIG. 4A still shows more details than control circuit block diagrams 115, 215 and 315 but remains a simplified diagram intended to show only the level of detail necessary for the description of the present invention. As such certain functional connections between the various internal circuit blocks, that would be visible in a detailed control circuit 415 block diagram, are not shown so as not to obscure the teachings of the present invention.

As described with reference to FIG. 1 above, the example configuration shown in FIG. 4A uses a high voltage node 434 coupled to a node internal to the structure of power switch 405. The example configuration of FIG. 4A is therefore one where the control circuit 415 and power switch 405 could be monolithically integrated on a single silicon die where this internal node of power switch 405 is available. As shown in the depicted example, node 434 is coupled to regulation circuit 435, which can have similar functionality to blocks 135, 235 and 335 as shown in FIGS. 1, 2 and/or 3, and is shown coupled to receive a power down/reset signal 457 from unregulated dormant mode control circuit 440. It is appreciated that although the combined power down/reset signal 457 is illustrated as a single connection in FIG. 4A, the power down and reset signals of power down/reset signal 457 could also be separate electrical signals with separate electrical connections in another example.

In the example of FIG. 4A, control circuit 415 includes a drive signal generator 454, which in the example is illustrated as including an on/off control circuit. In the illustrated example, the on/off control circuit of drive signal generator 454 is coupled to receive an EN signal 456 output from the FB block 451. The FB block 451 is coupled to receive a feedback signal at FB terminal 423. In the illustrated example, the FB block 451 generates the output EN signal 456 as low when no switching of power switch 405 is required but as high when switching of power switch 405 is required. In other examples, FB terminal 423 and FB block 451 could be adapted to receive and process a DC or AC feedback signal depending on the external circuit configurations as discussed with reference to FIGS. 1, 2 and/or 3 above.

As shown in FIG. 4A, one example of the unregulated dormant mode control circuit 440 of control circuit 415 includes a power down (PD) detection block 458, event counter 498, power up (PU) detection block 442 and latch circuit 459 coupled as shown. When the energy requirement of the one or more loads coupled to the energy transfer element at the output of a power converter, such as for example loads 121, 221 and 331 in FIGS. 1, 2 and 3, respectively, falls below a threshold value, the internal EN signal 456 will stay low for more than 128 cycles of oscillator 452. In the illustrated example, PD detection block 458 includes a 7-bit counter, which functions as a divide-by-128 circuit. It is appreciated that in other examples the PD detection block 458 could be designed to act as a divide-by circuit for a range of 50-250 oscillator cycles. Accordingly, if the 7-bit counter of PD detection block 458 of the unregulated dormant mode control circuit 440 does not receive a high EN signal 456 for 128 oscillator cycles, the PD detection block 458 outputs a pulse 461 with a logic high state which clocks an input to event counter circuit block 498 and increments a counter internal to block 498 by 1. The PD detection block 458 is then reset when the drive signal 422 again goes high indicating that the feedback signal at FB terminal 423 is indicating more energy is required by a load or loads coupled to the energy transfer element at the output of a power converter. EN signal 456 therefore goes high and drive signal 422 in turn goes high. In the example, drive signal 422 is also coupled to event counter block 498. In one example if drive signal 422 goes high more than once within the 128 oscillator counts, the event counter 498 is also reset as this indicates that any prior reduction in energy requirement sufficient to generate a logic high pulse from PD detection block 458, was a transient event and gate drive signals are now being generated again with the drive signal 422 being low for less than 128 oscillator 452 cycles. If however only one drive signal 422 pulse is received by event counter block 498 within 128 oscillator 452 counts, the event counter is not reset. If the 7-bit counter of PD detection block 458 of the unregulated dormant mode control circuit 440 again does not receive a high EN signal 456 for 128 oscillator cycles, the PD detection block 458 again outputs a pulse 461 with a logic high state which is used as an input to event counter circuit block 498 and increments a counter internal to block 498 by another 1. If the event counter block 498 counter reaches a count of n, which in one example is 4, block 498 outputs a logic high signal 497 and triggers the latch circuit 459 to send the power down/reset signal 457 to most of the internal circuit blocks of control circuit 415. In the illustrated example, these blocks are coupled to receive the power down/reset signal 457 include feedback circuit block 451, oscillator circuit block 452, over current detect circuit block 453, which detects the current flowing through power switch 405, drive signal generator block 454 and the 7 bit counter 458. In one example, when all these blocks are powered down in response to the power down/reset signal 457, the controller 415 consumes a current, $I_{cc}$ 480, of only 2 to 5 µA.

In one example therefore, a time period of unregulated dormant mode operation is initiated when the event counter 498 counts n consecutive events for which the time between drive signal 422 logic high states exceed 128 oscillator 452 cycles. It is appreciated that the value of 128 oscillator cycles could be modified to any number of oscillator cycles or any time period measured through means other than the oscillator 452.

Figure 4B:
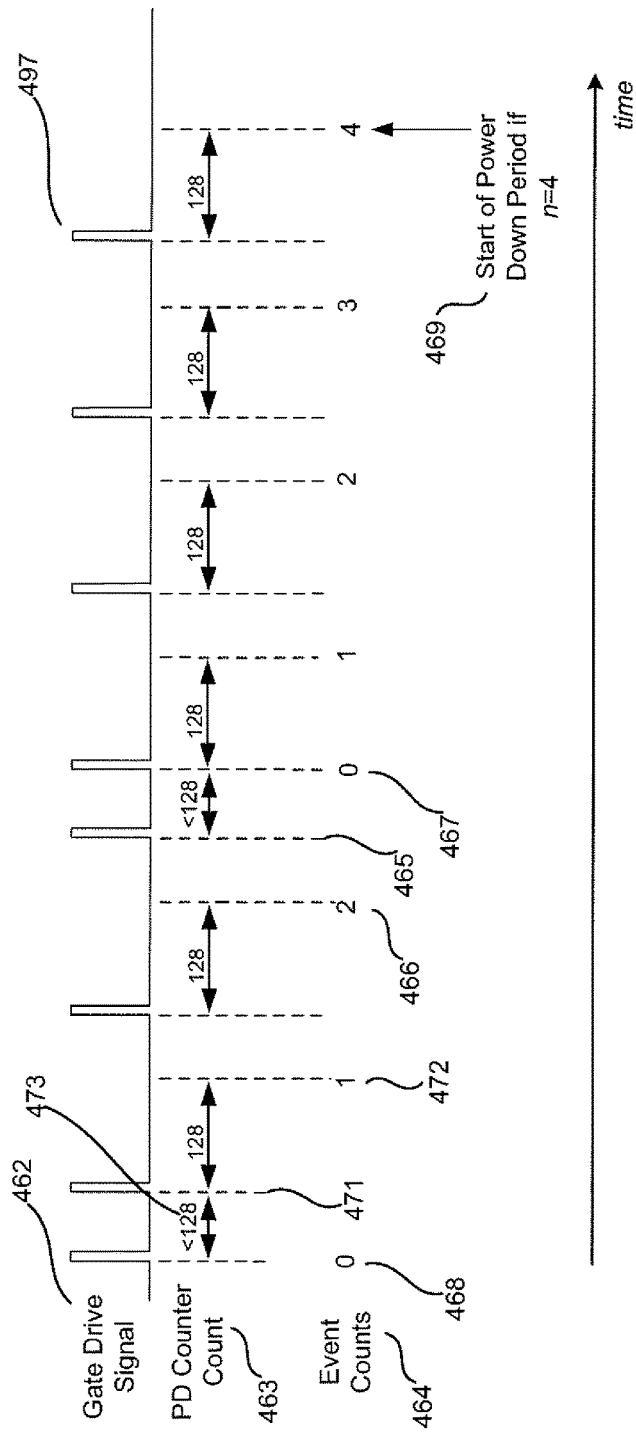
FIG. 4B shows example timing and signal waveforms that in one example are from a control circuit with the block diagram of FIG. 4A

FIG. 4B shows waveforms that in one example could be generated within the block diagram of FIG. 4A. FIG. 4B illustrates one example of a sequence of gate drive pulses 462, which in one example could be the same as drive signal 422 in FIG. 4A, and the count of the PD counter 463, which in one example could be the count within block 458 in FIG. 4A, and the event count 464, which in one example could be the count within block 498 in FIG. 4A. The sequence starts at time point 468 where the event counter count 463 is 0. In the example, label 473 is the number of oscillator counts recorded during the indicated period of time between times 468 and 471. Fewer that 128 oscillator counts are recorded in PD counter count 463 before the next gate drive signal 462 is received at time point 471. The PD count is therefore reset at time 471 and the event counter count 464 remains 0. However at time point 472, 128 oscillator cycles have been received and the event counter count 464 is incremented. It is appreciated that in another example, the event counter could be incremented at the time when the next gate drive signal 497 high pulse is received. Similarly, in the example, when the gate drive signal is received at time point 465, PD counter count 463 has again counted 128 oscillator cycles at time point 466, and therefore event counter count 464 is again incremented at time point 466. At time point 467 however another gate drive signal is received with PD counter count at <128. In the example therefore, both PD counter count 463 and event counter count 464 are reset at time point 467. In the example of FIG. 4B, between time point 467 and time point 469, there are 4 consecutive gate drive signals that are separated by more than 128 oscillator cycles and the even counter count therefore reaches a value of 4. In the example, the event counter threshold value of n in FIG. 4A is 4. Consequently, at time point 469 a power down or unregulated dormant mode operation period is initiated.

Since regulator circuit 435 is turned off in response to the power down/reset signal 457, external bypass capacitor 433 is no longer charged through regulator circuit 435, bypass capacitor 433 will begin to discharge and the bypass voltage 450 will start to drop. In the illustrated example, the bypass voltage 450 will drop from approximately 6 volts to an internally set PU detection voltage of approximately 3 volts. As shown in the example, PU detection block 442 remains coupled to detect the bypass voltage 450 and remains active (as well as latch circuit 459) during the unregulated dormant mode. In one example, PU detection block 442 includes a comparator coupled to bypass capacitor 433 to determine when the bypass voltage 450 has fallen to the 3 volt PU threshold. When the bypass voltage 450 has dropped to the 3 volt PU threshold, the PU reset signal 441 output from PU detection block 440 goes high, which causes power down/reset signal 457 from latch circuit 459 to go high and causes regulator circuit 435 to resume charging the bypass capacitor 433.

In one example, some or all of the other internal circuit blocks of controller circuit 415 may also resume functioning as bypass capacitor 433 is recharged. The bypass capacitor 433 will be charged up to approximately 6 volts and again the PD detection block 458 will start to sense if a high EN signal 456 is present at least once every 128 oscillator cycles, and if not, the PD detection block 458 will again cause output signal 461 from 7-bit counter 458 to generate a logic pulse and initiate a count within event counter block 498, which, if the count reaches a count of n, will retrigger the latch circuit 459 to cause a new shut down cycle to start.

As mentioned above, it is noted that in the specific example illustrated in FIG. 4A, a control circuit 415 that utilizes an on/off control scheme to regulate the flow of energy through the energy element coupled to the power switch is shown for explanation purposes. It is appreciated that control circuit 415 may utilize other known control schemes to regulate the flow of energy and detect no load or light load conditions in order to benefit from an unregulated dormant mode operation in accordance with the teachings of the present invention.

For instance, in another example, a magnitude of the feedback signal could be sensed by FB block 451 to detect the no load or light load condition. In such an example, the magnitude of the feedback signal could be a voltage value or a current value. In this example, when FB block 451 detects a magnitude of the feedback signal received at feedback terminal 423 that indicates a no load or light load condition, FB block 451 will output a signal 456 to PD detection block to indicate the no load or light load condition. In yet another example, a no load or light load condition may be detected by detecting a low switching frequency of the drive signal 422. In one example, the switching frequency of the drive signal 422 may be detected through the FB block 451, which is coupled to receive the feedback signal. In such an example, the switching frequency of the drive signal 422 may be derived from the feedback signal received at feedback terminal 423. In another example, PD detection block 458 could be coupled to receive the drive signal 422 to detect the low switching frequency condition of drive signal 422 to detect the no load or light load condition.

FIGS. 5A and 5B show example voltage waveforms, which in one example apply to the bypass voltage 450 at bypass capacitor 433 of FIG. 4A described above. FIG. 5B shows a waveform 501 that is an expanded view of region 502 from waveform 500 of FIG. 5A. In the example, the times shown in FIGS. 5A and 5B assume a bypass capacitor 433 value of 10 µF, an oscillator 452 frequency of 100 kHz and a current consumption ($I_{cc}$ 480) of 2 µA during the unregulated dormant mode period 503. In addition it is assumed that regulator circuit 435 charges bypass capacitor 433 with 2 mA when recharging bypass capacitor 433 from 3 to 6 V during period 504. Period 505 is of an undetermined value 'x' milliseconds since this is the period taken to recharge the output capacitor, such as for example capacitor 118, 218 or 318 and other capacitance coupled to auxiliary energy transfer element windings, such as for example capacitors 175 and 275. Period 505 is therefore a function of the choice of these capacitors, but in typical examples could be in the range of 5-20 milliseconds. Period 506 is the time it takes the 100 kHz oscillator to count through 128 cycles and then increment an event counter n times, where in the example n=4, before again recognizing in the example shown, that the energy requirement of the load is below a threshold value and has been for a period of time 506 and the control circuit again starts a period of unregulated dormant mode operation in accordance with the teachings of the present invention. It is appreciated that in one example, as described with respect to FIG. 4A, time period 506 is made up of a series of n events where consecutive drive signal 422 high/low events are separated by periods of time in excess of 128 oscillator cycles.

Figure 6:
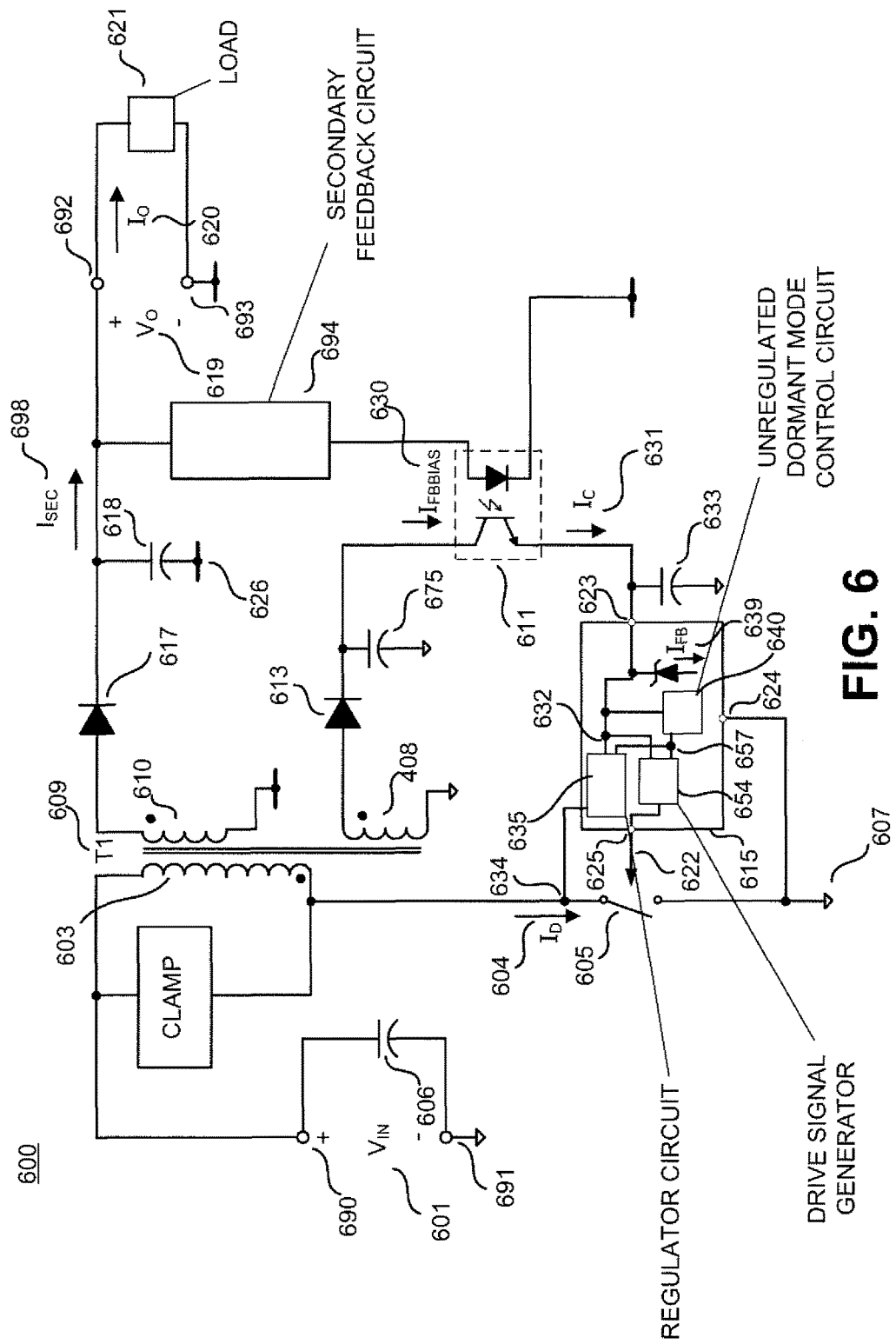
FIG. 6 is a schematic illustrating still another example flyback power converter employing still another example of a control circuit that reduces the energy consumption of the power converter under light or no load conditions by use of an unregulated dormant mode of operation in accordance with the teachings of the present invention.

FIG. 6 shows another example power converter 600 benefiting from the teachings of the present invention. As shown, the example circuit of FIG. 6 shares many aspects with those of FIGS. 1, 2 and/or 3 discussed above. A difference, however, includes that the circuit of FIG. 6 employs an optocoupler 611 and secondary feedback circuit block 694 to generate a feedback signal 639. In the example case of control circuit 615, current 631 is a combined feedback current and supply current to the control circuit 615 as used for example by the TOPSwitch family of integrated circuits manufactured by Power Integrations, Inc., of San Jose, Calif.

In the example of control circuit 615, therefore, the value of external bypass capacitor 633 determines the unregulated dormant mode time period. The variable used to detect when the energy required by the load circuit 621 has fallen below a threshold value to initiate the unregulated dormant mode of operation can also be the switching frequency of the power switch 605. However, in the example of control circuit 615, the magnitude of the feedback signal, such as the $I_C$ 631 feedback signal can also be used to detect when the energy required by the load circuit 621 has fallen below a threshold value to initiate the unregulated dormant mode of operation, as will be discussed with reference to FIG. 8. The magnitude of the feedback signal could be the current value of the $I_C$ 631 current, or in another example, the magnitude could be a voltage value responsive to the $I_C$ 631 current.

Figure 7:
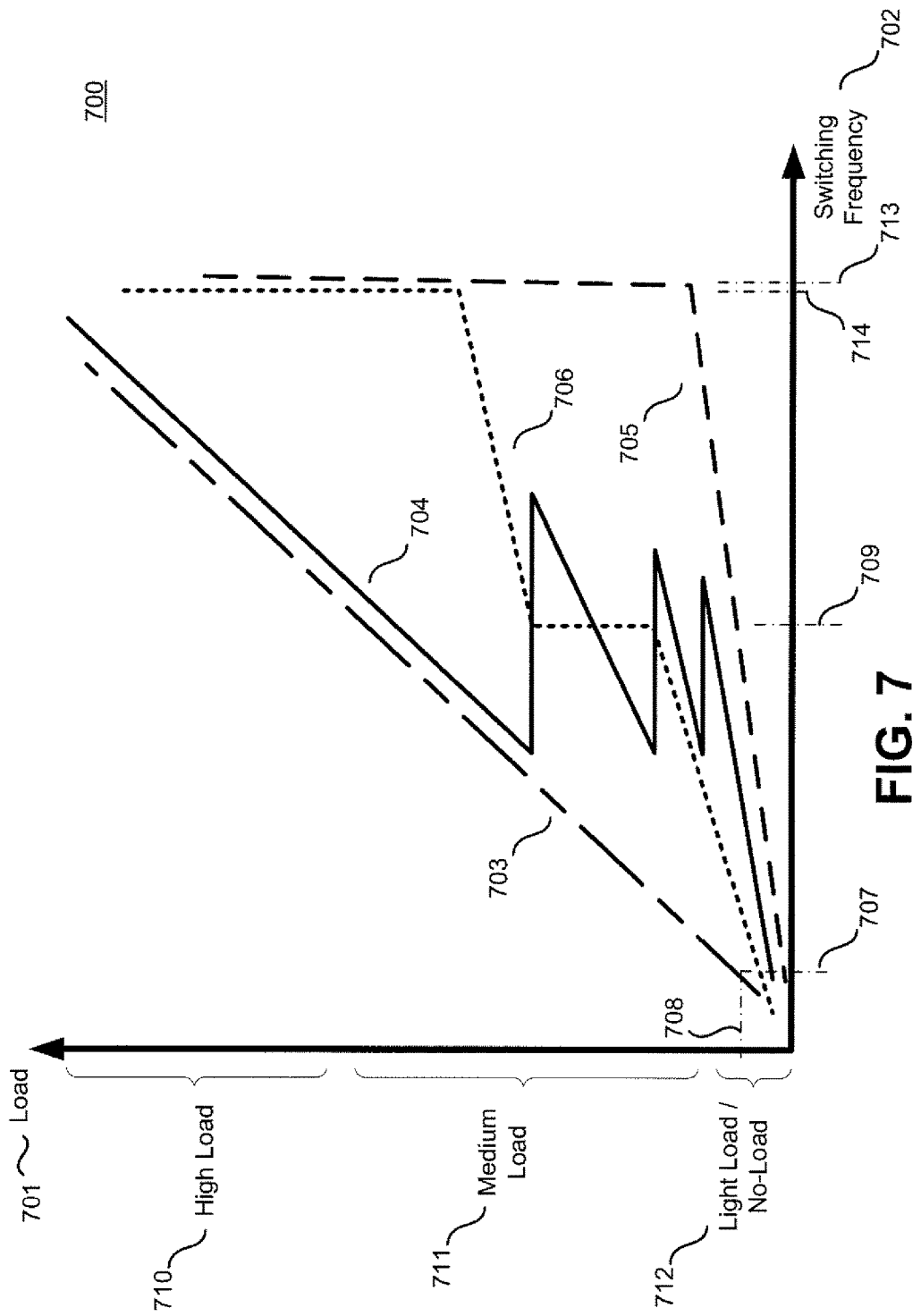
FIG. 7 is a graph showing typical switching frequency versus load characteristics of various control circuits that reduce the energy consumption of power converters under light or no load conditions.

FIG. 7 shows a few example load versus switching frequency characteristics of control circuits that could benefit from the example teachings of the present invention. Characteristic 703 is typical of simple on/off control or variable frequency control schemes discussed earlier, where load and switching frequency are linearly related. Examples of control circuits using this type of control scheme are Tiny Switch, LinkSwitch-LP, LinkSwitch-TN and LinkSwitch-XT, all manufactured by Power Integrations, Inc., of San Jose, Calif.

In the case of example characteristic 703, operation in the light load/no-load condition 712 region can for example be detected when the switching frequency falls below threshold value 707 indicating that the load has fallen below threshold value 708. Characteristic 704 is typical of an on/off control circuit with multiple power switch over current threshold levels and a state machine to determine which over current threshold to use in each load condition. Examples of control circuits using this type of control scheme are TinySwitch-II, TinySwitch-III, PeakSwitch and LinkSwitch-II, all of which are manufactured by Power Integrations, Inc., of San Jose, Calif. Characteristic 705 is typical of a PWM control circuit characteristic where operation in high load condition 710 and/or medium load condition 711 is typically with fixed average switching frequency 713, but where average switching frequency is reduced in the light and no-load region 712. Examples of control circuits using this type of control scheme are TOPSwitch-FX and TOPSwitch-GX, both of which are manufactured by Power Integrations, Inc., of San Jose, Calif. Characteristic 706 is typical of a PWM control circuit with more complex control schemes where operation in high load condition 710 and a portion of medium load condition 711 is typically with fixed average switching frequency 714, but where the average switching frequency is reduced in other portions of medium load condition 711 and light load/no-load condition 712 regions. An example of a control circuit using this type of control scheme is TOPSwitch-HX manufactured by Power Integrations, Inc., of San Jose, Calif.

Regardless of the control scheme used, a common factor is that switching frequency is reduced at light load/no-load conditions and can therefore be used as a way to detect a light or no-load condition on the output of a power converter. This is true of numerous other control circuits using these or other light load operating schemes, such as burst mode, where the average switching frequency is also reduced under light load/no-load conditions.

Figure 8:
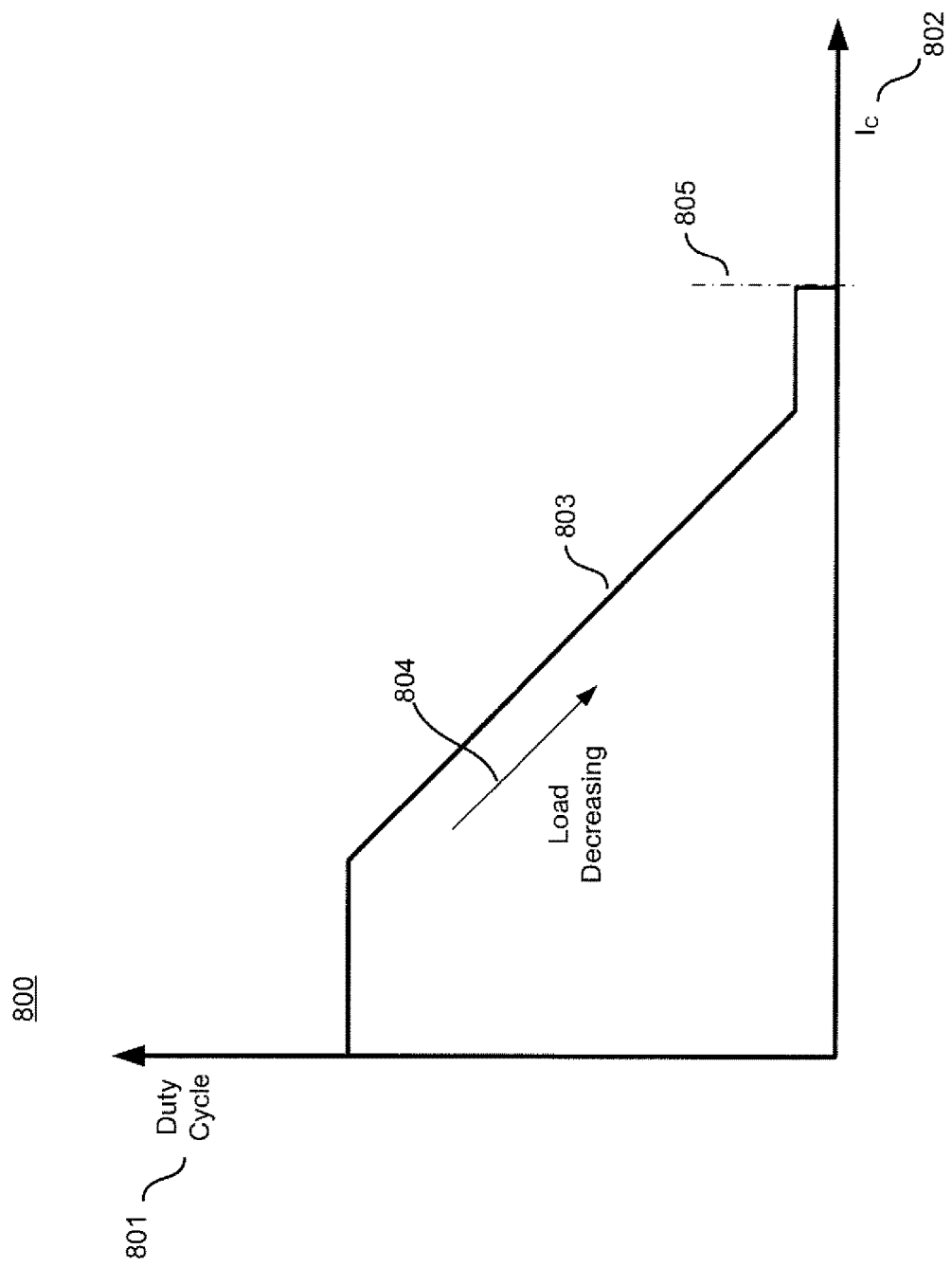
FIG. 8 is a graph showing an example control characteristic of a control circuit that reduces the energy consumption of a power converter under light or no load conditions in accordance with the teachings of the present invention

FIG. 8 shows an example of a duty cycle 801 versus $I_C$ 802 current characteristic, which in one example could apply to the circuit configuration described above with reference to FIG. 6. The example characteristic of FIG. 8 illustrates that the detection of a light load/no-load condition is not limited to detecting a switching frequency of a power switch. As shown in the example characteristic of FIG. 8, a reduction in load on the output of the power converter is indicated by an increase in Ic 802 current as indicated by label 804. Detection of a threshold Ic current 805, where the duty cycle falls to substantially zero, in combination with an event counter or timer can therefore be used as an indication that the energy requirements of a load at the output of the power converter have fallen below a threshold value for a period of time and could therefore be used to initiate a period of unregulated dormant mode operation in accordance with the teachings of the present invention. It is appreciated that with other control schemes, there are other ways that may be employed to indicate a light load/no-load condition and used therefore to initiate an unregulated dormant mode of operation in accordance with the teachings of the present invention.

Figure 9:
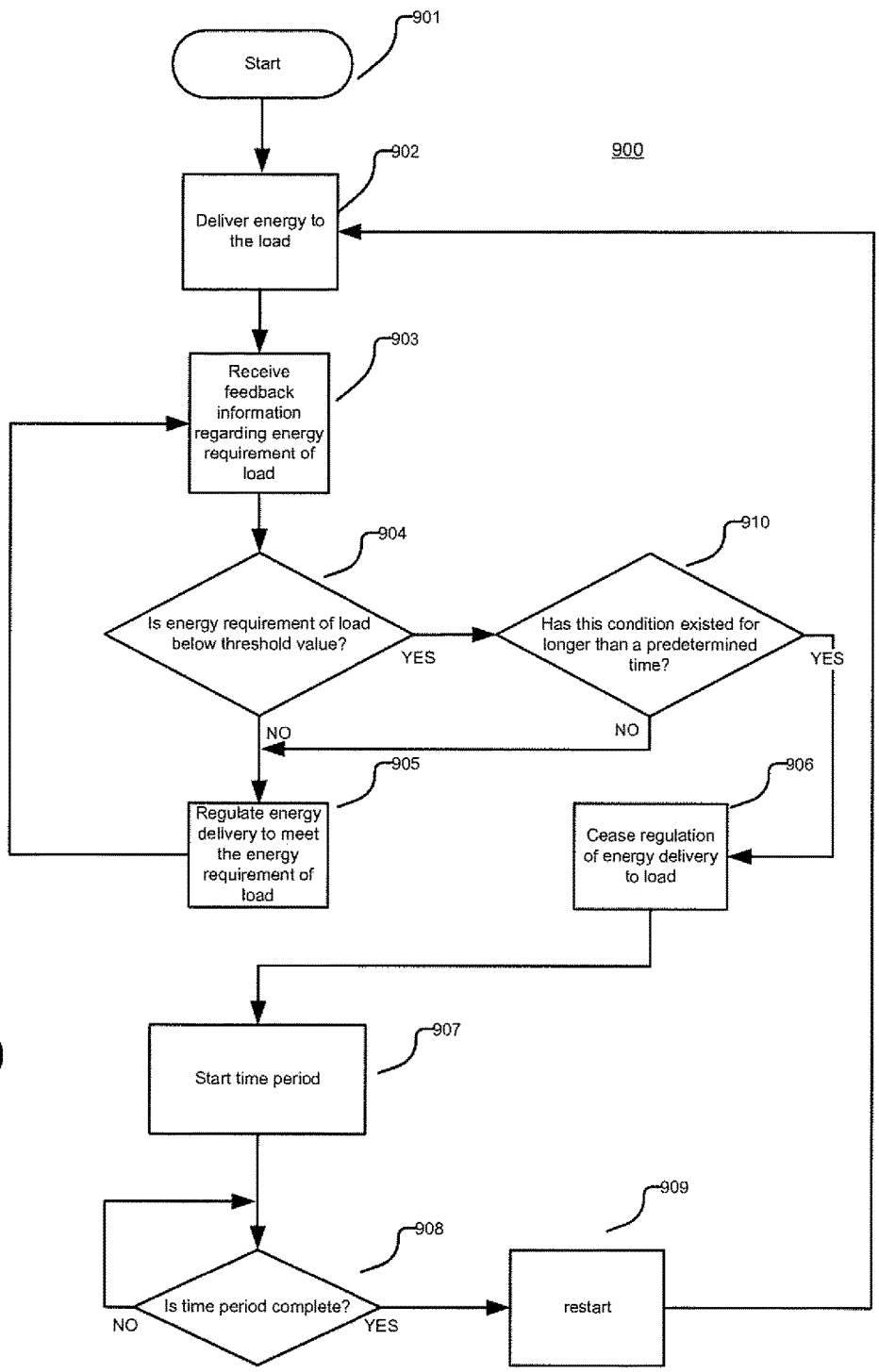
FIG. 9 is a flowchart illustrating an example method for reducing the energy consumption of a power converter under light or no load conditions by use of an unregulated dormant mode of operation in accordance with the teachings of the present invention.

FIG. 9 shows generally a flowchart 900 describing one example method of implementing an unregulated dormant mode of operation in a power converter in accordance with the present invention. As shown in the example, the power converter starts up in block 901 and energy is delivered to the load in block 902. In block 903, feedback information is received regarding the energy requirement of the load and in block 904, it is decided whether the energy requirement of the load is below a threshold value, which would indicate a light load/no-load condition. If not, energy delivery is regulated in block 905 and again feedback information is received in block 903. If however, in block 904 it is decided that the energy requirement of the load is below a threshold value, which would indicate a light load/no-load condition, in block 910, it is determined whether this condition has existed for longer than a predetermined period of time. If it has, in block 906 regulation of energy delivery is ceased, and in block 907 a time period of unregulated dormant mode is started. In either blocks 906 or 907, unnecessary circuit blocks are powered down so as to reduce energy consumption during the time period of unregulated dormant mode. In block 908 it is decided whether the time period of unregulated dormant mode is complete. When it is, the power converter is restarted in block 909 and then returns to block 902 where energy is delivered to the load. It is appreciated that in one example, block 909 could be eliminated if a YES decision in block 908 was connected directly to block 901 where the initial start up of the power converter is undertaken. However, the presence of block 909 allows for a different start up mode when the period of unregulated dormant mode operation is complete which could include for example starting up in a lower energy consumption state than the normal start up of the power supply in order to check for the presence of a light or no-load condition without all of the control circuit blocks being active for example and therefore reducing energy consumption even further. If in block 904, the energy requirement of the load is not below a threshold value or if in block 910, the condition of the energy requirement of the load being below a threshold value has not exited for longer than a threshold period of time, energy delivery to the load is again regulated in block 905 and information regarding the energy requirement of the load is again received in block 903.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A method for controlling an output of a power converter with a control circuit, the method comprising:
generating a drive signal to control switching of a switch to regulate the output of the power converter;
detecting if a switching period of one switching cycle of the drive signal exceeds a threshold switching period; and
disabling the drive signal when a period of a switching cycle of the drive signal exceeds the threshold switching period for a threshold consecutive number of switching cycles.

2. The method of claim 1, wherein the drive signal is unresponsive to the output of the power converter in response to said disabling the drive signal.

3. The method of claim 1, wherein said generating the drive signal to control switching of the switch comprises generating the drive signal in a variable frequency control scheme such that a load coupled to the output of the power converter and the switching frequency are linearly related.

4. The method of claim 1, wherein said generating the drive signal to control switching of the switch comprises generating the drive signal in an on/off control scheme such that a load coupled to the output of the power converter and the switching frequency are linearly related.

5. The method of claim 1, further comprising powering up a drive signal generator coupled to generate the drive signal in response to disabling the drive signal for a first time period.

6. The method of claim 5, wherein said powering up the drive signal generator is responsive an external timer coupled to a terminal.

7. The method of claim 5, wherein the drive signal is unresponsive to changes in an energy requirement of the load coupled to the output of the power converter when the drive signal is disabled, and wherein the drive signal is responsive to changes in the energy requirement of the load coupled to the output of the power converter after the first time period has elapsed.

8. The method circuit of claim 1, wherein said detecting if the switching period of one switching cycle of the drive signal exceeds the threshold switching period comprises receiving an oscillating signal from an oscillator to detect if the switching period of one switching cycle of the drive signal exceeds the threshold switching period.

9. The method of claim 8, wherein said detecting if the switching period of one switching cycle of the drive signal exceeds the threshold switching period further comprises:
- counting with a first counter cycles of the oscillating signal to detect if the switching period of one switching cycle of the drive signal exceeds the threshold switching period; and
- counting with a second counter a number of times that a threshold number of oscillating signal cycles are counted.

10. The method of claim 9, further comprising resetting the first counter in response to an occurrence of a drive signal pulse prior to the first counter counting the threshold number of oscillator cycles.

11. The method of claim 9, further comprising resetting the second counter in response to an occurrence of a drive signal pulse prior to the first counter counting the threshold number of oscillator cycles.

12. A method for reducing energy consumption of a power converter with a control circuit, the method comprising:
- generating a drive signal to control switching of a switch to regulate an output of the power converter;
- operating in a burst switching mode responsive to the output of the power converter, wherein the burst switching mode includes a switching state in which switching is enabled and a non-switching state in which switching is disabled;
- detecting if a length of a non-switching state of the burst switching mode is longer than a threshold time period; and
- rendering the control circuit dormant if the length of the non-switching state of the burst switching mode is longer than the threshold time period for a threshold consecutive number of times.

13. The method of claim 12, further comprising operating in the burst switching mode in light load and no-load conditions for a load coupled to the output of the power converter.

14. The method of claim 12, wherein the drive signal is unresponsive to the output of the power converter when the control circuit is dormant.

15. The method of claim 12, further comprising powering up a drive signal generator coupled to generate the drive signal after control circuit has been rendered dormant for a first time period.

16. The method of claim 15, further comprising determining the first time period in response to an external timer coupled to a terminal.

17. The method of claim 15, wherein the drive signal is unresponsive to changes in an energy requirement of the load coupled to the output of the power converter when the drive signal is disabled, and wherein the drive signal is responsive to changes in the energy requirement of the load coupled to the output of the power converter after the first time period has elapsed.

18. A method for controlling a power converter with a control circuit having a dormant mode, the method comprising:
- generating a drive signal having a switching period for each switching cycle comprising an on-time and an off-time, the drive signal to control switching of a power switch to regulate an output of the power converter, wherein the drive signal may have a non-constant switching period;
- detecting if the switching period for a switching cycle exceeds a threshold switching period; and
- placing the control circuit in a reduced energy consumption state if the switching period for the switching cycle exceeds a threshold switching period for a threshold consecutive number of times.

19. The method of claim 18, wherein the threshold consecutive number of times is greater than two.

20. The method of claim 18, wherein the drive signal is unresponsive to the output of the power converter when the control circuit is in the reduced energy consumption state.

21. The method of claim 18, further comprising generating the drive signal such that an off time of the drive signal switching period is responsive to the output of the power converter.

22. The method of claim 21, further comprising generating the drive signal such that an on-time of the drive signal switching period is responsive to the output of the power converter.

23. The method of claim 18, further comprising operating in a burst mode, wherein the drive signal is generated with a non-constant switching period by skipping switching cycles.

* * * * *